(12) United States Patent
De La Garza et al.

(10) Patent No.: US 11,640,735 B2
(45) Date of Patent: *May 2, 2023

(54) LOCATION-AWARE BEACON SCANNING AND AUTHENTICATION FOR SECURE CONTROL OF IOT APPLICATIONS

(71) Applicant: T-Mobile USA, Inc., Bellevue, WA (US)

(72) Inventors: Christopher De La Garza, Seattle, WA (US); Omar Hassan, Kirkland, WA (US); Dragos Lazar, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,748

(22) Filed: Sep. 3, 2021

(65) Prior Publication Data

US 2021/0398371 A1    Dec. 23, 2021

Related U.S. Application Data

(63) Continuation of application No. 16/547,518, filed on Aug. 21, 2019, now Pat. No. 11,145,147.

(51) Int. Cl.
*G07C 9/00* (2020.01)
*H04L 9/40* (2022.01)
*H04W 12/06* (2021.01)
*H04W 4/029* (2018.01)
*H04W 4/80* (2018.01)
*H04L 67/12* (2022.01)
*H04W 12/0431* (2021.01)

(52) U.S. Cl.
CPC ...... *G07C 9/00309* (2013.01); *H04L 63/0884* (2013.01); *H04L 67/12* (2013.01); *H04W 4/029* (2018.02); *H04W 4/80* (2018.02); *H04W 12/0431* (2021.01); *H04W 12/06* (2013.01); *G07C 2009/00325* (2013.01)

(58) Field of Classification Search
None
See application file for complete search history.

(56) References Cited

U.S. PATENT DOCUMENTS

| | | | |
|---|---|---|---|
| 9,372,922 B2 | 6/2016 | Shaashua et al. | |
| 9,396,597 B2 | 7/2016 | Yamane et al. | |
| 9,593,522 B1 | 3/2017 | Murar et al. | |
| 10,013,825 B2 | 7/2018 | Belhadia et al. | |
| 11,145,147 B2 * | 10/2021 | De La Garza | G07C 9/00571 |

* cited by examiner

*Primary Examiner* — K. Wong
(74) *Attorney, Agent, or Firm* — T-Mobile USA, Inc.

(57) ABSTRACT

Systems and methods for location-aware scanning of an IoT beacon by a mobile device, and the authentication of the mobile device, are disclosed herein. The system detects when the mobile device is within a geofenced region associated with the IoT beacon and enables the scanning by the mobile device for signals from the beacon. Using the beacon signals received by the mobile device, the system detects when the mobile device and IoT beacon are sufficiently near one another. Once the mobile device and IoT beacon are sufficiently near each other, the system authenticates control of the mobile device over the IoT beacon by verifying an authentication key transmitted to a server.

20 Claims, 6 Drawing Sheets

LOCATION-AWARE BEACON SCANNING AND AUTHENTICATION FOR SECURE CONTROL OF IOT APPLICATIONS

CROSS-REFERENCE TO RELATED APPLICATIONS

This application is a continuation of U.S. patent application Ser. No. 16/547,518, filed Aug. 21, 2019, entitled LOCATION-AWARE BEACON SCANNING AND AUTHENTICATION FOR SECURE LOCK CONTROL AND OTHER IOT APPLICATIONS, which is hereby incorporated by reference in its entirety.

BACKGROUND

Smart lock devices combine a traditional mechanical locking mechanism with electronic control capabilities, including the ability to control the smart lock from a connected wireless device. For example, a wireless device such as a smartphone may be used to lock and unlock the smart lock affixed to the door of a house or building. The wireless device and smart lock may communicate with each other using Bluetooth, Bluetooth Low Energy (BLE), IEEE 802.11 (Wi-Fi), ZigBee, or other wireless communication protocols. The wireless device and smart lock may communicate wirelessly, for example, to determine the proximity between the wireless device and smart lock, to authenticate that the wireless device is permitted to control the smart lock, to communicate control instructions (e.g., commands to lock or unlock the smart lock), etc.

For assorted reasons the wireless device and smart lock may not communicate effectively or efficiently. As a result, the user experience of using a smartphone to control a smart lock may be made less user-friendly. Thus there is a need for a system and methods that overcome these problems and provide additional benefits.

Figure 1:
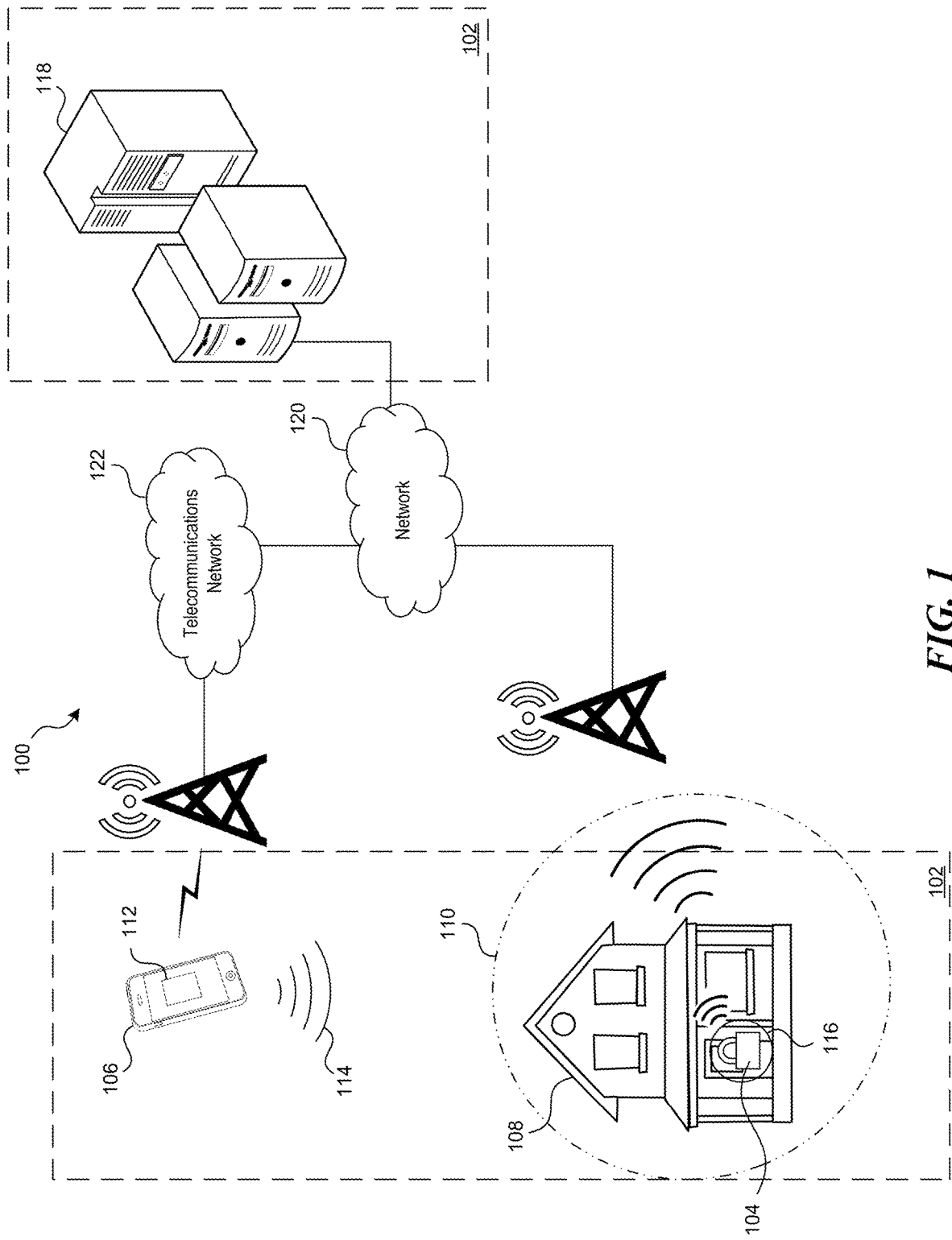
FIG. 1 illustrates an example of an environment in which some implementations of the present technology can be utilized in a system for location-aware smart lock control.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

To preserve battery power, to provide additional security, or for other reasons, some wireless devices place limitations on how the wireless device may utilize its wireless communication capabilities, such as when communicating with a smart lock. For example, certain smartphones may prevent an application on the smartphone from utilizing wireless communication capabilities unless the application is executing in the foreground. As a result, the user experience of using a smartphone to control a smart lock may be made less seamless or require additional user interaction.

Systems and methods for the location-aware control of an Internet of Things (IoT) device, such as a smart lock, are described herein. In various implementations of the described systems and methods, the smart lock is controlled by a wireless device such as a smartphone. Due to limitations imposed by the smartphone itself, and as described further below, in some cases the smartphone limits the extent to which the smartphone will communicate wirelessly with other devices, such as a smart lock, unless certain conditions are satisfied. Accordingly, in various implementations, the system evaluates the location of the smartphone to determine whether it is within a geographic region associated with the smart lock. Once the smartphone is within the smart lock's region, the system enables the wireless capabilities of the smartphone that allow the smartphone and smart lock to communicate. The system then utilizes the wireless communications between the smartphone and smart lock to determine whether the smartphone is within a threshold proximity of the smart lock. Once the system determines that the smartphone is near enough to the smart lock, the smartphone transmits an authentication key, such as a password, to an authentication server, to authenticate the smartphone access to the smart lock. If the transmitted authentication key is verified by the smart lock, the system grants the smartphone access to the smart lock. In various implementations, the system clears the transmitted authentication key from the authentication server, such as after the authentication key has been verified by the smart lock or some configured time after the authentication key has been transmitted to the smart lock (e.g., five to ten seconds). Overall, the systems and methods facilitate seamless communication between a wireless device and an IoT device, without user involvement, as well as provide other benefits.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 and the following discussion provide a brief, general description of a suitable environment in which a system for the location-aware control of an Internet of Things (IoT) device may be implemented. Although not required, aspects of the invention are described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (Plods), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to the figures, FIG. 1 is a block diagram illustrating a representative environment 100 in which a system 102 can operate. The system 102 is a system for the location-aware control of an IoT device, such as facilitating the authorized control of a smart lock 104 by a mobile device 106 (smartphone, laptop, tablet, etc.). While FIG. 1 illustrates a smart lock, and while this detailed description of examples of the invention uses the term "smart lock," one of ordinary skill in the art would understand that the discussion would apply to other IoT devices that can communicate with connected devices, including "smart" thermostats, cameras, appliances, sensors, etc. For example, the IoT device may be a doorbell configured to ring when approached by registered mobile devices (for example, devices associated with certain friends and family members). For a further example, the IoT device may be a security system configured to arm or disarm based on proximity to registered mobile devices. As an additional example, the IoT device may be an electrical outlet configured to enable or disable the outlet (i.e., provide electrical power) based on proximity to registered mobile devices. Of course, the IoT device can perform these and other actions in response to successful control from a mobile device.

The smart lock 104 controls physical access to a building 108. Although FIG. 1 illustrates using the smart lock 104 to control access to an exterior door of a residential home, the smart lock can also be used to control access to a commercial or industrial building, to interior doors, to a container, or to other items or entries that can be physically secured with a lock. The smart lock 104 is also associated with a geographic region 110, which defines a physical area surrounding the smart lock. For example, the smart lock 104 can be located at identified coordinates (e.g. geographic latitude and longitude coordinates), and the geographic region 110 can be defined based on a threshold distance from those coordinates (e.g., 50 ft, 100 ft, etc.).

It is known that certain mobile devices 106 limit the ability of mobile applications 112 from utilizing certain wireless communication channels 114 for communicating with other devices, including smart lock 104, under certain conditions. For example, a mobile device 106 can require that any application 112 attempting to identify or communicate with a smart lock 104 via a wireless communication channel 114 must be operating in the foreground of the mobile device (that is, the application must be the focus of execution, is being used by the user, is being rendered on the mobile device display, etc.). Such mobile devices 106 can prevent applications 112 executing in the background from utilizing the wireless communication channel 114.

The system 102 evaluates the location of the mobile device 106 to determine whether the mobile device has entered the geographic region 110 associated with the smart lock 104. The system 102 can determine the location of the mobile device using a Global Positioning System (GPS) system, as well as via location-determination methods that are assisted by a telecommunication network 122 associated with the mobile device 106, including a Time Difference on Arrival (TDOA) procedure or a Round Trip Time (RTT) procedure. When the system 102 determines that the mobile device 106 has entered the geographic region 110 associated with the smart lock 104, it enables further use of the wireless communication channel 114, including by applications 112 executing in the background of the mobile device. Accordingly, the mobile device 106 and applications 112 can utilize the wireless communication channel 114 to communicate with the smart lock 104 or other devices. Communication over the wireless communication channel 114 can entail communicating using the Bluetooth protocol, Bluetooth Low Energy (BLE) protocol, IEEE 802.11 (Wi-Fi) protocol, ZigBee protocol, or other protocols suitable for near-range wireless communication between devices. In some implementations, once the system 102 detects that the mobile device 106 has entered the geographic region 110, other wireless and Bluetooth capabilities of the mobile device, in addition to the ability to scan for signals on a wireless communication channel 114, can be enabled.

Once the mobile device 106 is within the geographic region 110, the mobile device and smart lock 104 can communicate over the wireless communication channel 114. The system 102 evaluates the communications over the wireless communication channel 114 to determine if the mobile device 106 is within a threshold proximity 116 of the smart lock 104. For example, the system 102 can evaluate the signal strength of Bluetooth signals or beacons transmitted by the smart lock 104, and received by the mobile device 106, to determine an approximate nearness between the smart lock and mobile device. As a further example, the system 102 can evaluate the Received Signal Strength Indication (RSSI) of Bluetooth beacon signals transmitted by the smart lock 104 and received by the mobile device 106. The RSSI, or other indicator associated with the Bluetooth beacon signals, can be used by the system to further characterize a nearness of the mobile device to the lock as immediate, near, far, or other.

The system 102 utilizes an authentication server 118 (or other server) to facilitate verification of mobile device 106 in connection with accessing the smart lock 104. For example, the authentication server 118 can be used to receive an authentication key from the mobile device 106 and then transmits the authentication key to the smart lock 104, thereby eliminating the need for the mobile device to send the authentication key directly to the smart lock (which may be susceptible to a man-in-the-middle attack). The system 102 can remove the authentication key from the authentication server 118, after it has been conveyed from the mobile device 106 to the smart lock 104, so as to reduce the likelihood that an attack on the authentication server will yield the authentication key.

The smart lock 104, mobile device 106, and authentication server 118 communicate with each other through one or more public or private, wired or wireless networks 120, including, for example, the Internet, as well as telecommunication network 122. The smart lock 104 and mobile device 106 communicate wirelessly with a base station or access point using a wireless mobile telephone standard, such as the Global System for Mobile Communications (GSM), Long Term Evolution (LTE), IEEE 802.11, or another wireless standard, and the base station or access point communicates with the authentication server 118 via the network 120. The mobile device 106 additionally communicates wirelessly with the telecommunication network 122 using, for example, nearby cell towers or base stations using wireless mobile telephone standards, such as Global System for Mobile Communications (GSM), CDMA (Code Division Multiple Access), General Packet Radio Service (GPRS), and the like. The network 120 and telecommunication network 122 can be interconnected such that, for example, a mobile device 106 connected to the telecommunication network 122 can communicate via the network 120 with smart lock 104 or authentication server 118. The smart lock 104 and mobile device 106 utilize applications or other software, which operate through the use of computer executable instructions. Some such applications can be directed toward the authentication process.

Figure 2A:
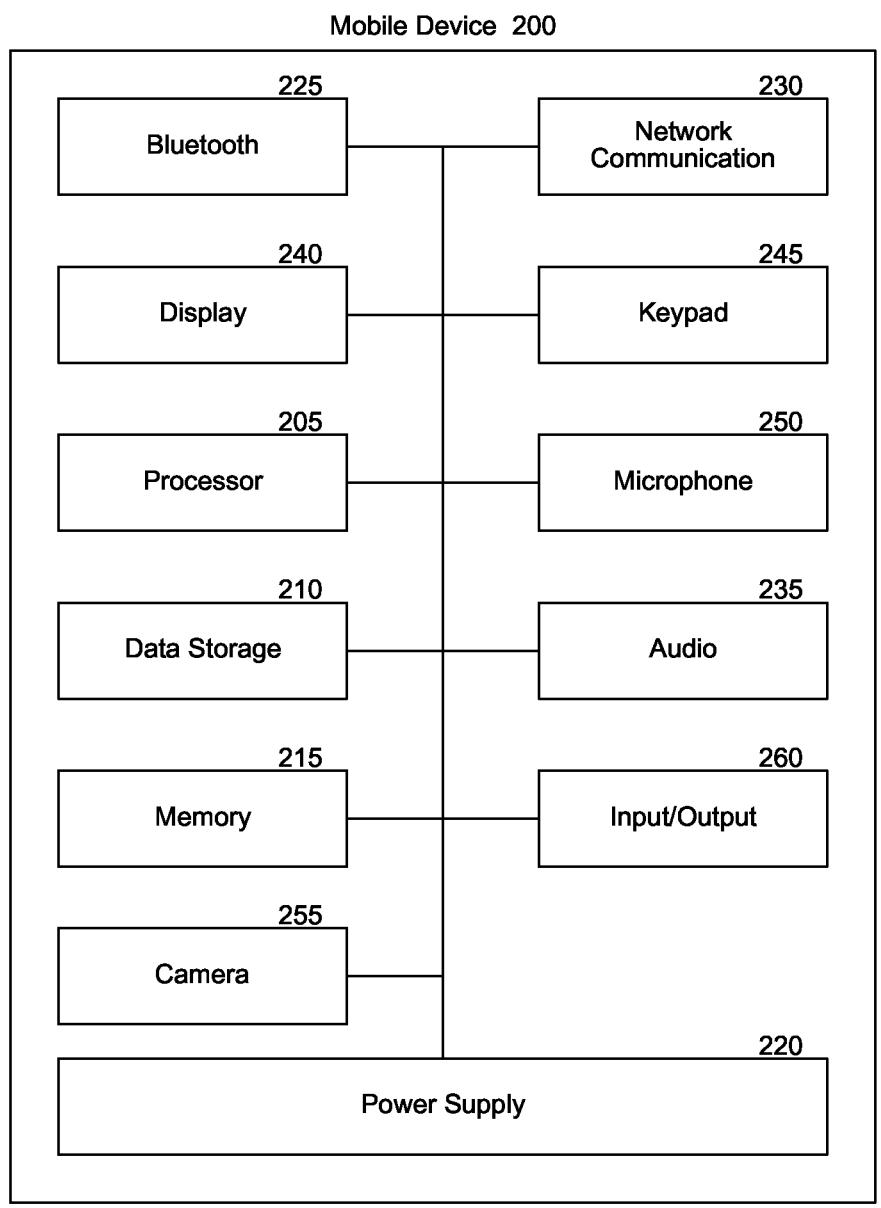
FIG. 2A is a block diagram of a representative mobile device.

FIG. 2A is a block diagram of a representative mobile device that may serve as a handset for controlling a smart lock. Mobile device 200 typically includes a processor 205 for executing processing instructions, a data storage medium component 210 (e.g., hard drive, flash memory, memory card, etc.), volatile memory and/or nonvolatile memory 215, a power supply 220, one or more network interfaces (e.g., Bluetooth Interface 225; and Network Communication Interface 230, which enables the mobile phone to communicate by transmitting and receiving wireless signals using licensed, semi-licensed or unlicensed spectrum over a telecommunications network), an audio interface 235, a display 240, a keypad or keyboard 245, a microphone 250, one or more cameras 255, and other input and/or output interfaces 260. The various components of the mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more components for the system 102 for the location-aware control of an IoT device.

Mobile device 200 may be virtually any device for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Mobile device 200 may connect to a telecommunications network via a trusted radio access network (RAN) or an untrusted RAN. A single mobile device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, 5G, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), any of the IEEE 802.11 WLAN protocols, High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Figure 2B:
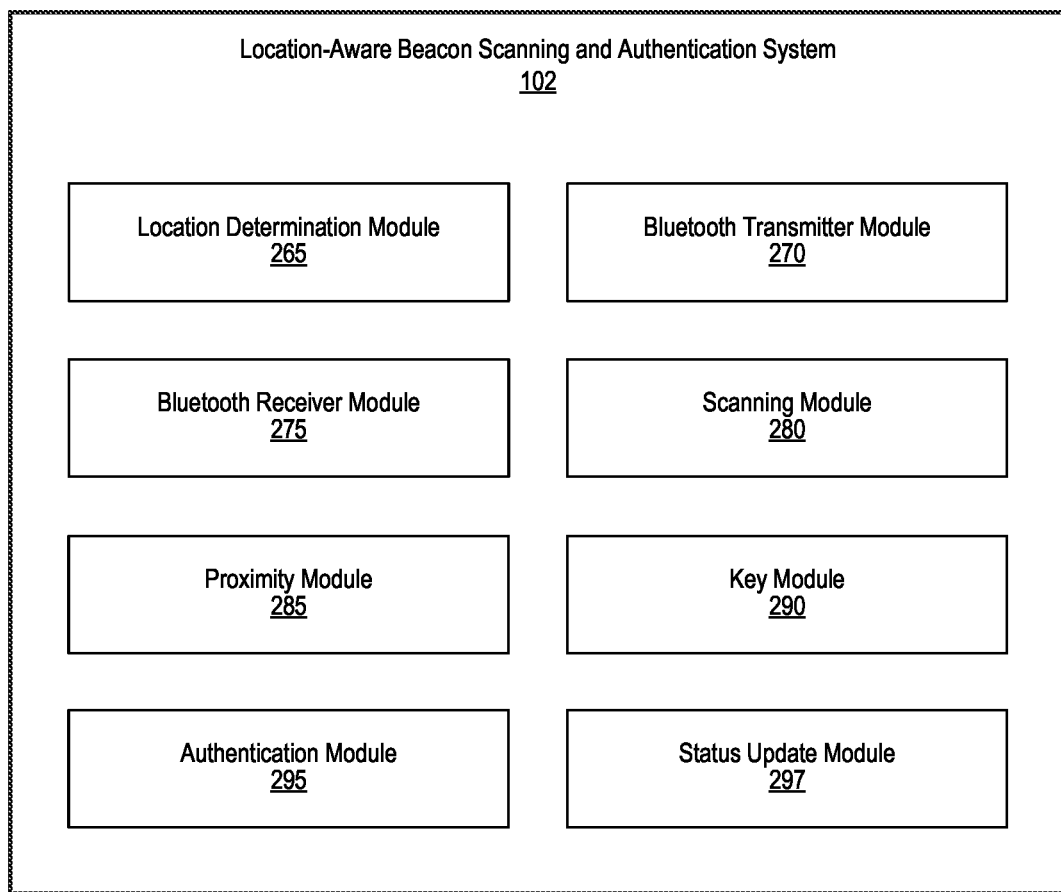
FIG. 2B illustrates a set of components of a location-aware smart lock control system according to various implementations.

FIG. 2B illustrates a set of components, such as software components, of a system 102 used for the location-aware control of an IoT device, according to various implementations. Components of the system 102 can be located in or executed on one or more of smart locks 104 or other IoT devices, mobile devices 106, authentication servers 118, as well as applications executing on those devices or others.

A location determination module 265 determines the geographic location of a mobile device. The location of the mobile device can be determined using a Global Positioning System (GPS) system, as well as via location-determination methods that are assisted by a telecommunications network, including a Time Difference on Arrival (TDOA) procedure or a Round Trip Time (RTT) procedure. The location determination module 265 additionally evaluates whether the determined location of the mobile device is within a geographic region associated with the smart lock. For example, the smart lock geographic region can be characterized by a center point (i.e., a geographical coordinate, often defined by latitude and longitude coordinates) and a radius, defining a circle surrounding the smart lock. As a further example, the smart lock can be characterized by a set of coordinates defining the boundaries of a region.

A Bluetooth transmitter module 270 transmits Bluetooth signals. The transmitted Bluetooth signals can operate as Bluetooth beacons that indicate, to a receiving device, the presence and identity of the transmitting device. Similarly, a Bluetooth receiver module 275 receives Bluetooth signals. Both standard Bluetooth and Bluetooth Low Energy are contemplated, which provide ranges of under 100 m and 50 m respectively. Though this detailed description of examples of the invention uses the terms "Bluetooth transmitter module" and "Bluetooth receiver module," one of ordinary skill in the art would understand that other wireless modules configured to transmit or receive other wireless signals appropriate for near-range communication between devices can be used, such WLAN protocols like IEEE 802.11ah (offering ranges below 200 m), near field communication (NFC) protocols (offering ranges below 20 cm), and so forth.

A scanning module 280 enables the scanning for wireless communication signals by other components, including by applications (not shown). For example, certain mobile devices and mobile device operating systems prevent applications from scanning for Bluetooth beacons, or other wireless signals, when the application is executing in the background. When certain conditions are satisfied, such as when the mobile device enters a defined geographic region, the scanning module 280 enables the scanning. For example, an application executing in the background can act on Bluetooth beacon signals received by the Bluetooth receiver module 275.

A proximity module 285 is used to determine whether a mobile device is within a threshold proximity of the smart lock. For example, the proximity module 285 can evaluate the signal strength of Bluetooth beacon signals received by the Bluetooth receiver module 275 and assess whether the signal strength is of sufficient strength (where greater signal strength indicates closer proximity). The proximity module can evaluate the Received Signal Strength Indication (RSSI) of a received signal and evaluate whether it exceeds a threshold. As a further example, components of the mobile device, including the mobile device operating system or other application, can assign a nearness characterization based on the received signals, where the nearness characterization includes "immediate," "near," "far," and "unknown." The proximity module 285 can determine that the nearness characterization indicates that the mobile device is sufficiently close to the smart lock, for example, the nearness characterization is "immediate" or "near," which can be less than 10 feet.

A key module 290 transmits an authentication key from a mobile device when certain conditions are satisfied. For example, the key module 290 can transmit the mobile device authentication key when the proximity module 285 determines that the mobile device is sufficiently close to the smart lock (e.g., Bluetooth signals transmitted by the smart lock and received by the mobile device indicate that the devices are "immediate" or "near" to each other). As described herein, the system 102 utilizes the authentication key to verify whether the transmitting mobile device should be granted access to a smart lock. For example, the mobile device can have been registered with the smart lock during a prior registration process, thereby establishing that the mobile device is entitled to control the smart lock (i.e., can send commands to the smart lock to lock or unlock the device). During the registration process, a password or other form of authentication key may have been established or generated. The authentication key (or key seed) is saved in the mobile device, such as in key module 290, to establish in subsequent communications that the mobile device communicating with the smart lock is a mobile device that was previously registered. The key module 290 can transmit the authentication key to an authentication server or other server computer, such as over a data network. The key module 290 can also transmit the authentication key to the smart lock using, for example, near-range wireless communication between the two devices, a telecommunication network, a data network, etc.

An authentication module 295 evaluates whether an authentication key from a mobile device authenticates the control or use of a corresponding smart lock by the mobile device. As described above, the smart lock can be registered to one or more mobile devices from a prior registration process, and each registered mobile device can correspond to a unique authentication key. Each of the corresponding authentication keys established or generated during the registration processes can be stored by the authentication module 295. When an authentication key is received from a mobile device, the authentication module 295 determines whether the transmitted key corresponds to a key already associated with the smart lock. If there is a match, the transmitting mobile device is authenticated. Alternatively, the system can use a cryptographic protocol employing algorithmically generated authentication keys that use, for example, key seeds (at both the mobile device and in the network) that are algorithmically combined with a timestamp to generate current, unique and expiring keys. Other cryptographic schemes are of course possible. In general, the terms "password" and "authentication key" are generally used interchangeably herein, because the present system is not limited to the specific cryptographic scheme employed.

A status update module 297 notifies other components of the system 102 when there has been a change in status of the smart lock, such as when the smart lock has been unlocked or when there has been a failed attempt to unlock the smart lock. The status update can be transmitted to an authentication server, or other server computer, to indicate that any authentication key that passed through the server should be cleared.

Figure 3:
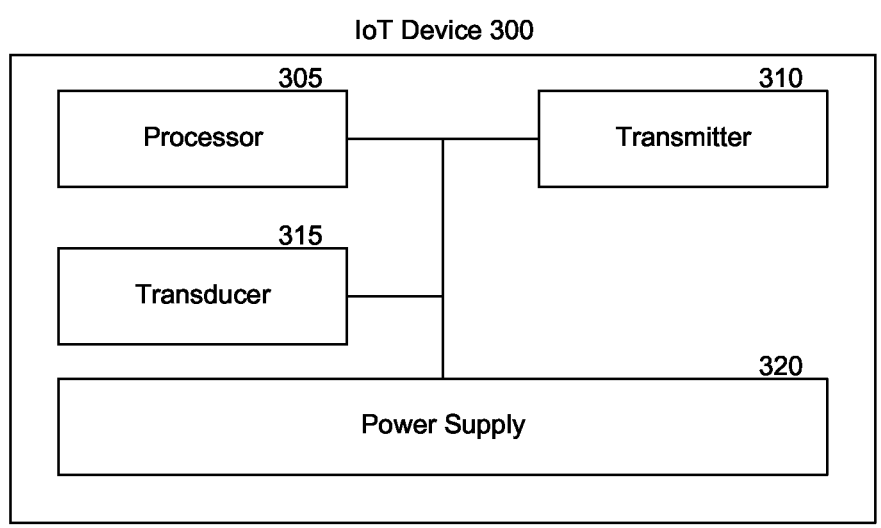
FIG. 3 is a block diagram of a representative IoT device.

FIG. 3 is a block diagram of a representative IoT device that may be controlled by a mobile device. IoT device 300 typically includes a processor 305 for processing instructions, a transmitter 310 for interfacing with one or more wireless networks (e.g., mobile telecommunication networks, Wi-Fi, Bluetooth, Bluetooth Low Energy, IEEE 802.11ah, NFC, etc.), transducer 315, and a power supply 320. The transmitter 310 can be a Bluetooth LE beacon. The transducer 315 can be any electromagnetically operable component configured to effectuate a physical change based on an instruction (e.g., one or more instructions or commands from the processor 305 or transmitter 310). In some embodiments, the transducer 315 can control the locking and unlocking of a physical lock, latch, deadbolt, etc.

Figure 4:
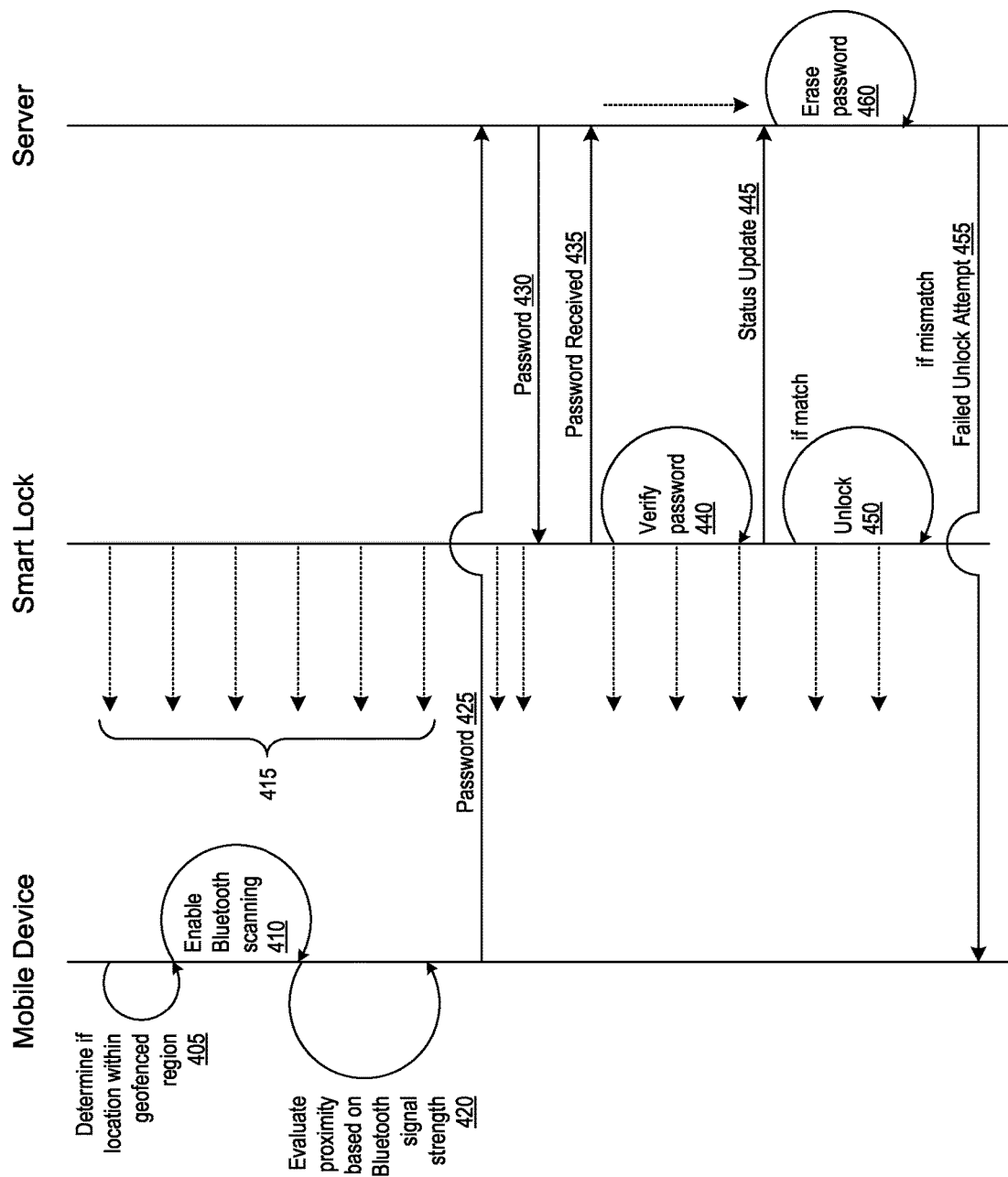
FIG. 4 is a message sequence diagram illustrating an example of a sequence of messages between components according to various implementations.

FIG. 4 illustrates a message sequence in a system 102 for the location-aware control of an IoT device, according to various implementations. In particular, FIG. 4 illustrates a sequence of messages between a mobile device, a smart lock, and a server.

At a step 405, the mobile device evaluates whether it is within a geofenced region associated with the smart lock. The evaluation can be performed continuously, periodically (e.g., every 30 seconds), randomly, etc.

Once the mobile device is within the geofenced region, at a step 410 Bluetooth scanning is enabled for the mobile device. Enabling Bluetooth scanning can comprise activating a Bluetooth receiver of the mobile device, enabling foreground or background applications running on the mobile device to act on received Bluetooth signals, or other techniques. As illustrated in FIG. 4, the smart lock periodically transmits Bluetooth signals 415, or beacons, indicating the presence and identity of the smart lock. Once Bluetooth scanning is enabled at the step 410, the mobile device and applications executing thereon are enabled to receive and act upon the Bluetooth signals 415.

At a step 420, the mobile device evaluates whether it is within sufficient proximity to the smart lock based on one or more Bluetooth signals 415 received from the smart lock.

Once the mobile device is within sufficient proximity to the smart lock, the mobile device transmits a password 425 or other authentication key to a server. The server then transmits the received password 430 to the smart lock. In other words, in the implementations illustrated in FIG. 4, the server operates as a conduit through which a password is transmitted from a mobile device to a smart lock, thereby eliminating the need for the mobile device to transmit the password directly to the smart lock (such as over Bluetooth or some other near-range wireless communication). It is known that such direct communication of passwords between a mobile device and smart lock can be susceptible to man-in-the-middle attacks.

At a step 435, the smart lock transmits a notification to the server that the smart lock received the password or other authentication key. In some embodiments, and as described further herein, the server uses the notification as a trigger to begin a timer. After a configurable amount of time has elapsed (e.g., five to ten seconds), the server erases from its memory the password 425 it received from the mobile device.

At a step 440, the smart lock verifies the received password. For example, the smart lock can evaluate whether the received password matches any one of one or more passwords already associated with the smart lock, such as through a prior registration process.

At a step 445, the smart lock transmits to the server a status update based on the result of the verification check (i.e., whether or not the password was verified). The server updates its corresponding status designation for the lock based on the status update. For example, if the status update indicates the password verification failed, the server may update its status to reflect that there was an unsuccessful attempt to unlock the lock. As a further example, if the status update indicates a successful password verification check, the server may update its status to reflect the success and that the lock is being unlocked or has been unlocked.

If the received password is successfully verified, then at a step 450 the smart lock unlocks. As illustrated, the smart lock automatically unlocks based on the proximity of a verified mobile device, and without involvement from a user. That is, the user does not need to bring a control application running on the mobile device to the foreground, does not need to enter a password into the mobile device, etc.

If the received password is not successfully verified, then at a step 455 the server notifies the mobile device of the attempt to unlock the smart lock with an incorrect password. The server may send the notification to the mobile device that attempted to unlock the smart lock, to a mobile device associated with the smart lock (e.g., through a prior registration process), or a combination.

At a step 450 the server erases the password 425 it previously received from the mobile device. By erasing the password, the system 102 improves security by ensuring that the password does not remain in server memory indefinitely. In some embodiments the server erases the password after receiving the notification that the password was received by the smart lock (at step 435). In some embodiments the server erases the password after receiving the status update from the smart lock regarding the password verification (at a step 445). The server may erase the password immediately after the triggering notification or after a configurable amount of time has elapsed (e.g., five to ten second). Of course, if a time-varying authentication key or password is used, such erasing step is unnecessary because the authentication key has only a narrow time window in which it is valid.

Figure 5:
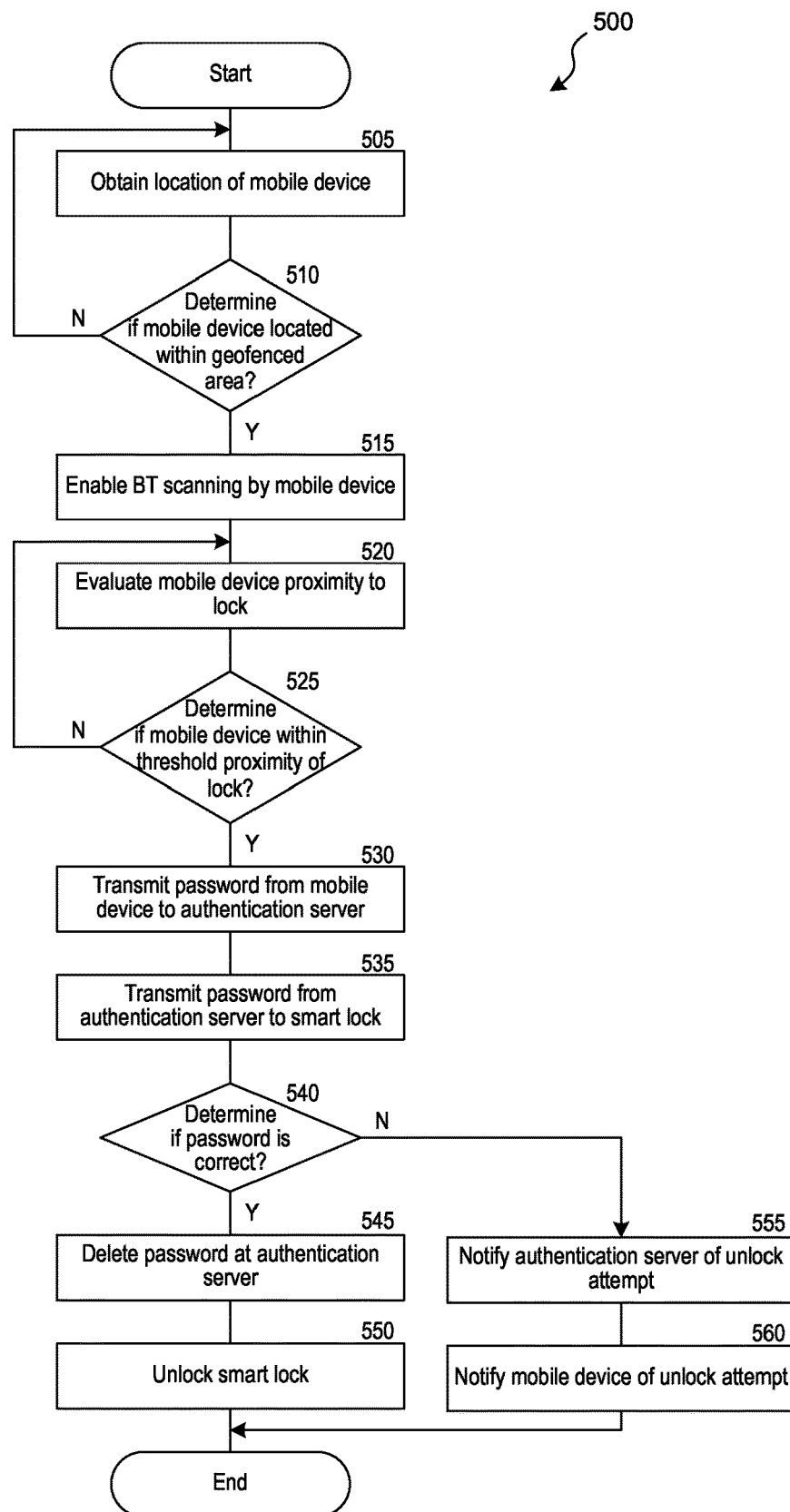
FIG. 5 is a flow diagram illustrating a set of operations for controlling a smart lock according to various implementations.

FIG. 5 is a flow diagram illustrating a process 500 performed by the system 102 for controlling a smart lock. As described below, FIG. 5 illustrates an example process in which the system unlocks a smart lock after detecting that a verified mobile device is within a certain proximity of the smart lock. It will be appreciated that some of the operations of process 500 can similarly be used in implementations in which the mobile device locks a smart lock, as well as implementations in which IoT devices other than a smart lock are found.

At a block 505, the system obtains the location of the mobile device. The location of the mobile device can be obtained, for example, whereby the location determination module 265 on the mobile device 200, using GPS, TDOA, RTT, or other location-determination procedures, determines a location of the mobile device.

At a decision block 510, the system determines whether or not the obtained location of the mobile device 200 is within a certain geofenced area. The geofenced area may, for example, be associated with the smart lock 104 and can be a predefined radius around the GPS location coordinates of the smart lock. For example, the mobile device can have previously been registered with the smart lock, and information regarding the corresponding geofenced area can have been saved to the mobile device at that time, whereby the location determination module 265 compares a current location of the mobile device to the stored geofenced location. If the mobile device location is not within the geofenced region, the process returns to block 505 such that the mobile device location can continue to be obtained and evaluated (e.g., as the device moves). If the mobile device location is within the geofenced region, processing continues to a block 515.

At block 515, the system enables Bluetooth scanning by the Bluetooth radio 125 of the mobile device 200. For example, the scanning module 280 of the mobile device can enable applications running in the background on the mobile device to scan for and act upon Bluetooth signals transmitted by a Bluetooth beacon, including the transmitter 310 of the smart lock 104.

At a block 520, the system evaluates Bluetooth signals from the smart lock, operating as a Bluetooth beacon, to determine an approximate proximity between the mobile device and smart lock. For example, proximity module 285 of the mobile device 200 can evaluate the signal strength of Bluetooth signals received via the Bluetooth receiver module 275 of the mobile device 200.

At a decision block 525, the system determines whether the mobile device is within a sufficient proximity to the smart lock. For example, the proximity module 285 of the mobile device 200 can evaluate whether the signal strength of Bluetooth signals received by the mobile device from the smart lock exceed a threshold. If the mobile device and the smart lock are not within a sufficient proximity, the process returns to block 520 such that proximity between the mobile device and smart lock can continue to be evaluated (e.g., as the mobile device moves closer to the smart lock). If the mobile device is sufficiently proximate to the smart lock, processing continues to a block 530.

At block 530, the mobile device transmits a password or other authentication key to an authentication server. For example, the key module 290 of the mobile device 200 can transmit the password or authentication key. The transmitted password can be unique to the mobile device, the smart lock, and/or the combination of the mobile device and smart lock, and can have been generated during a prior registration process between the mobile device and smart lock.

At a block 535, the authentication server transmits the password (received at block 530) to the smart lock.

At a decision block 540, the system determines whether the system is able to verify the password received from the mobile device, for example by the authentication module 295 of the mobile device 200. For example, as described above, one or more passwords can have been associated with the smart lock from a prior registration process, and the system can evaluate whether the received password matches any of the associated passwords. If the received password is not verified, then the proximate mobile device is not authenticated, and processing continues to a block 555. If the received password is verified, processing continues to a block 545.

If the password was verified at decision block 540, then at block 545 the system deletes the password that was transmitted through the authentication server. Though not shown, the deletion of the password at the authentication server can be conditioned on receiving a status update from the status update module 297 of the mobile device 200.

At a block 550, the system unlocks the smart lock. As described above, in additional implementations in which the smart lock is already unlocked, the system can alternatively lock the smart lock. In additional implementations, at block 550 the system can grant the mobile device additional or alternative access privileges over the smart lock (e.g., change smart lock settings, configure additional registered mobile devices, etc.).

If the password was not verified at decision block 540, then at block 555 the system notifies the authentication server of the failed unlock attempt. As a result, the authentication server may update its status to reflect that there was a failed unlock attempt at the smart lock. Though not shown, the authentication server may also delete the password that was transmitted through the authentication server.

At a block 560, the system sends a notification to the mobile device of the failed unlock attempt. The server may send the notification to the mobile device that attempted to unlock the smart lock, to a mobile device associated with the smart lock (e.g., through a prior registration process), or some other mobile device.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

We claim:

1. At least one non-transitory computer-readable medium, carrying instructions, which when executed by a wireless mobile device, perform operations for activating an Internet-of-Things (IoT) device based on proximity of the mobile device to the IoT device, the operations comprising:
    perform a two-step proximity determination comprising:
        determine, in a first step of the two-step proximity determination, by the mobile device, a geographic location of the mobile device;
        determine, at the mobile device, whether the geographic location of the mobile device is within a predefined geographic region associated with the IoT device;
        in a second-step of the two-step proximity determination, upon determining that the mobile device is within the geographic region associated with the IoT device, then enabling a Bluetooth capability of the mobile device;
    determine whether a proximity between the mobile device and the IoT device is within a threshold proximity based on a wireless signal transmitted by the IoT device; and
    when the mobile device is within the threshold proximity, transmit an authentication key to an authentication server,
        wherein the transmitted authentication key causes the IoT device to in turn receive the authentication key from the authentication server to permit the IoT device to activate.

2. The non-transitory computer-readable medium of claim 1, wherein the geographic location of the mobile device is determined based on a Global Positioning System (GPS) calculation, a Time Difference on Arrival (TDOA) procedure using a telecommunication network associated with the mobile device, or a Round Trip Time (RTT) procedure using the telecommunication network associated with the mobile device.

3. The non-transitory computer-readable medium of claim 1, wherein enabling the Bluetooth capability of the mobile device comprises enabling an application on the mobile device to scan for Bluetooth signals, and wherein an operating system of the mobile device prevents background applications on the mobile device from scanning for Bluetooth signals unless enabled by the operating system, or wherein the application is enabled to scan for Bluetooth signals while running in the background on the mobile device.

4. The non-transitory computer-readable medium of claim 1, wherein enabling the Bluetooth capability of the mobile device comprises enabling an application on the mobile device to scan for Bluetooth signals.

5. The non-transitory computer-readable medium of claim 1, wherein the IoT device is a smart lock, and wherein a Bluetooth beacon signal from the smart lock is a Bluetooth Low Energy (BLE) signal.

6. The non-transitory computer-readable medium of claim 1, wherein the proximity between the mobile device and the IoT device is evaluated based on a Received Signal Strength Indication (RSSI) of the received Bluetooth beacon signal.

7. The non-transitory computer-readable medium of claim 1, wherein the proximity between the mobile device and the IoT device comprises a designation of immediate, near, and far, and wherein the mobile device and the IoT device are within the threshold proximity when the proximity is immediate or near.

8. The non-transitory computer-readable medium of claim 1, wherein the IoT device is a smart lock, and further comprising transmitting, from the IoT device, a lock status update to the authentication server, wherein the lock status update results in clearing the authentication key from the authentication server, and wherein a lock status update is transmitted based on the evaluation by the IoT device of the received authentication key.

9. A server computer communicatively coupled to a wireless network, comprising:
    at least one hardware processor; and
    at least one hardware memory, coupled to the at least one hardware processor and storing instructions, which when executed, perform operations comprising:
        receiving from a wireless mobile device an authentication key,
            wherein a two-step proximity determination was previously performed, the two-step proximity determination process including:
                in a first step of the two-step proximity determination, a geographic location of the mobile device was previously determined to have been within a predefined geographic region associated with an Internet of Things (IoT) device,
                in a second step of the two-step proximity determination, upon determining that the mobile device was within the geographic region associated with the IoT device, near-range wireless capability of the mobile device was enabled to receive a near-range wireless signal transmitted from the IoT device;
            wherein a range of the IoT device for the near-range wireless signal is less than a range of signals between the mobile device and the wireless network; and
            wherein the mobile device had previously determined that the mobile device was within a threshold proximity to the IoT device; and
        transmitting the authentication key to the IoT device,
            wherein the IoT device then performs an action based on a positive evaluation of the received authentication key.

10. The server computer of claim 9, further storing instructions which, when executed by the server computer in the wireless network, performs further operations comprising deleting the authentication key after receiving a status update from the IoT device.

11. The server computer of claim 9, wherein the near-range wireless signal is a Bluetooth signal or a Bluetooth Low Energy signal, and wherein the wireless network employs 3G, 4G or 5G cellular communication protocols.

12. The server computer of claim 9, wherein the IoT device is a smart lock and wherein the action performed by the IoT device is unlocking the smart lock.

13. The server computer of claim 9, wherein the IoT device is a doorbell and wherein the action performed by the IoT device is ringing the doorbell.

14. The server computer of claim 9, wherein the IoT device is an electrical outlet and wherein the action performed by the IoT device is activating the electrical outlet to provide electricity.

15. An Internet of Things (loT) device, the IoT device comprising:
  at least one hardware processor;
  at least one wireless transceiver coupled to the processor;
  at least one data storage component, coupled to the processor, and storing instructions, which when executed by the at least one hardware processor, implement aspects of a two-step proximity determination comprising:
    in a first-step of the two-step proximity determination transmit via the wireless transceiver a near-range communication signal to the wireless mobile device,
      wherein a wireless mobile device determines whether the wireless mobile device is within a geographic region associated with the IoT device, and
      wherein the wireless mobile device scans for the near-range communication signals transmitted by the wireless transceiver of the IoT device when the wireless mobile device determines that the wireless mobile device is within the geographic region associated with the IoT device;
    in a second-step of the two-step proximity determination:
      when the wireless mobile device is within a threshold proximity of the IoT device based on a near-range communication beacon signal from the IoT device, the wireless mobile device transmits an authentication key to an authentication server; and
      the wireless transceiver of the IoT device receives from the authentication server the authentication key; and
    based on receipt of the authentication key, causing an activation to be performed.

16. The IoT device of claim 15, wherein the near-range communication signals are transmitted using a Bluetooth Low Energy (BLE) protocol.

17. The IoT device of claim 15, wherein determining whether the wireless mobile device is within the threshold proximity of the IoT device comprises:
  determining a Received Signal Strength Indication (RSSI) of the near-range communication beacon signal from the IoT device; and
  evaluating whether the RSSI exceeds an RSSI threshold.

18. The IoT device of claim 15, wherein determining whether the wireless mobile device is within the threshold proximity of the IoT device comprises:
  identifying, based on a near-range communication beacon signal from the IoT device, a proximity designation of at least immediate, near, or far; and
  determining whether the proximity designation is immediate or near.

19. The IoT device of claim 15, wherein receiving the authentication key to the authentication server causes the IoT device to evaluate the authentication key.

20. The IoT device of claim 15 wherein the authentication server deletes the authentication key after receiving a status update from the IoT device.

* * * * *